(12) United States Patent
Lu

(10) Patent No.: US 11,606,641 B2
(45) Date of Patent: Mar. 14, 2023

(54) MAGIC CUBE SPEAKER

(71) Applicant: Dan Lu, Guangdong (CN)

(72) Inventor: Dan Lu, Guangdong (CN)

( * ) Notice: Subject to any disclaimer, the term of this patent is extended or adjusted under 35 U.S.C. 154(b) by 117 days.

(21) Appl. No.: 16/843,734

(22) Filed: Apr. 8, 2020

(65) Prior Publication Data
US 2020/0329309 A1    Oct. 15, 2020

(30) Foreign Application Priority Data

Apr. 9, 2019 (CN) .......................... 201910278829.0
Apr. 9, 2019 (CN) .......................... 201920466778.X

(51) Int. Cl.
*H04R 3/00* (2006.01)
*H01M 10/46* (2006.01)
*H02J 7/00* (2006.01)

(52) U.S. Cl.
CPC .............. *H04R 3/00* (2013.01); *H01M 10/46* (2013.01); *H02J 7/0045* (2013.01); *H02J 7/0047* (2013.01); *H01M 2220/30* (2013.01); *H04R 2420/07* (2013.01)

(58) Field of Classification Search
CPC ..... H04R 3/00; H04R 2420/07; H01M 10/46; H01M 2220/30; H02J 7/0045; H02J 7/0047; A63F 9/08
See application file for complete search history.

(56) References Cited

U.S. PATENT DOCUMENTS

| 2008/0070657 A1* | 3/2008 | Kratz | A63F 9/24 |
| | | | 463/9 |
| 2012/0184341 A1* | 7/2012 | Dai | A63F 9/0842 |
| | | | 463/9 |
| 2018/0161668 A1* | 6/2018 | Chen | A63F 9/0842 |
| 2019/0374849 A1* | 12/2019 | Limaye | A63F 9/0612 |
| 2020/0009451 A1* | 1/2020 | Dor | A63F 13/35 |
| 2020/0370745 A1* | 11/2020 | Cairns | G02B 6/0085 |

FOREIGN PATENT DOCUMENTS

CN          101815231 A      *    8/2010

OTHER PUBLICATIONS

Huang et al., "CN 101815231—Rotatable Magic Cube Type Audio Equipment", Aug. 25, 2010, WIPO IP Portal, Machine Translation of National Biblio. Data and Description, https://patentscope.wipo.int/search/en/detail.jsf?docPN=CN101815231, pp. 1-3 (Year: 2010).*

* cited by examiner

*Primary Examiner* — Daniel R Sellers
(74) *Attorney, Agent, or Firm* — Mei & Mark LLP; Manni Li

(57) ABSTRACT

Magic cube speaker with charging stand, charging block, and methods for controlling the same, comprising a magic cube module having a liner with a cavity inside and splicing blocks installed on surface of the liner, a speaker inside the cavity, a charging interface, and a button mounted to the splicing block. The splicing block comprises sound passages formed by a sound inlet port, a sound outlet port, and a middle section between the sound inlet and outlet ports. A first sound transmission channel is formed by the cavity inside the liner, the sound transmission holes, the sound inlet port, the hollow space inside the splicing block, and the sound outlet port, and a second sound transmission channel is formed by the cavity inside the liner, the sound transmission holes, the sound inlet port, the hollow space inside the splicing block, and the plurality of the micro holes.

17 Claims, 13 Drawing Sheets

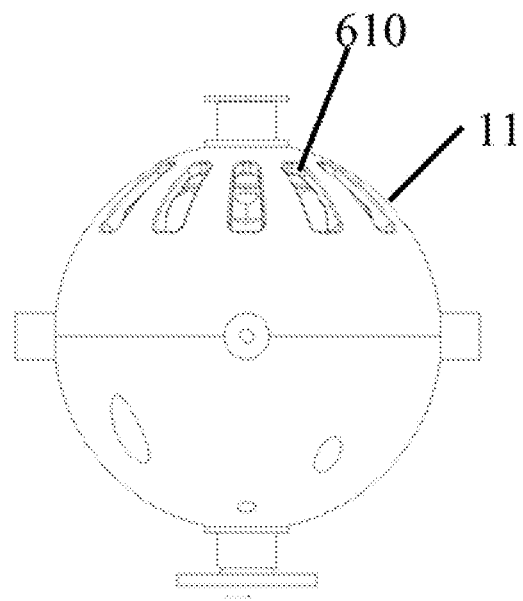
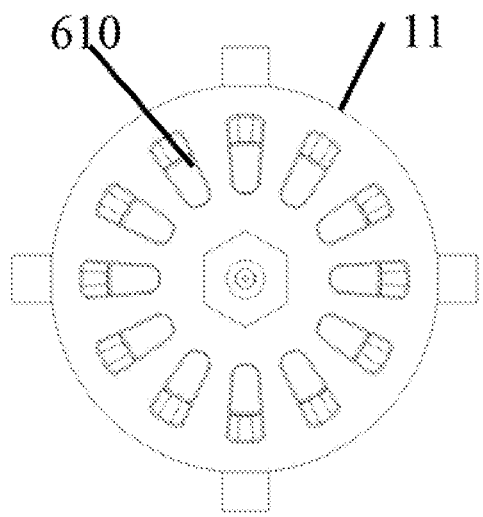
FIG. 6A
FIG. 6B
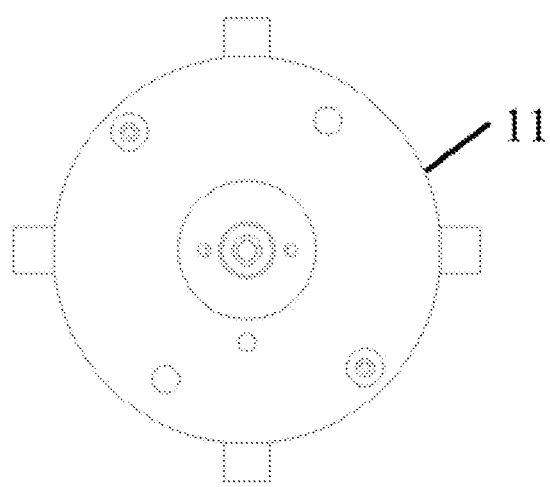
FIG. 6C

MAGIC CUBE SPEAKER

CROSS-REFERENCE TO RELATED APPLICATIONS

The subject application claims priority on Chinese Application Nos. 201910278829.0 and 201920466778.X, both filed on Apr. 9, 2019 in China. The contents and subject matter of the Chinese priority applications are incorporated herein by reference.

TECHNICAL FIELD

The present invention relates to an integrated magic cube toy and speaker and player that not only has the appearance of the magic cube, but also fully functions as the magic cube for playing and a speak, charging stand and block therefor, and methods for controlling the same.

BACKGROUND OF INVENTION

Traditional magic cube, also known as the Rubik's Cube, is a toy for training the human IQ. Some Bluetooth audio devices available on the market bear the name of the magic cube, however, they have only the appearance of the magic cube, but the magic cube is in a fixed and nonmovable shape so they can't be played as the magic cube.

Currently, an integrated magic cube speaker that has the actual moving function of the magic cube and function of a Bluetooth speaker at the same time is not feasible due to limitation on the technology. For examples, the volume of the Bluetooth speaker is relatively large, thus, it is difficult to fit inside the magic cube. In fact, there is no enough space to even fit the battery for the speaker inside the blocks of the magic cube, while it would be preferred to have the same size as the traditional magic cube for playing in the hand. Further, the Bluetooth speaker is difficult to control and charge once it fits inside the magic cube. Moreover, the sound of the Bluetooth speaker cannot be transmitted to the outside with satisfactory quality.

SUMMARY OF THE INVENTION

To overcome the technical difficulties, the present invention provides an integrated and fully functional and playful magic cube speaker, charging stand and charging block therefor, and methods for controlling the same. The magic cube speaker of the present invention simultaneously functions as the toy, speaker, and player, and the functions do not interfere with each other while being used.

The magic cube speaker of the present invention comprises a magic cube module having a liner with a cavity inside and a plurality of splicing blocks installed on the surface of the liner; a speaker installed inside the cavity; a charging interface; and a button mounted to one of the splicing blocks and electrically connected to the speaker.

In the present invention, the magic cube module implements the actual function of the magic cube, the speaker implements the speaker function, the speaker is charged through the charging interface, and the button implements the control function.

In the present invention, the magic cube module comprises a liner, a plurality of splicing blocks installed on the surface of the liner, and a cavity in the interior of the liner. The liner has a circular shape, is hollow inside, and has an upper end and a lower end. The upper end of the liner has a first hole, and the lower end of the liner has a second hole. The upper end of the first hole has a first tube body, and the lower end of the second hole has a second tube body. The first tube body connects to the liner through the first hole, and the second tube body connects to the liner through the second hole. The liner has a first hemispherical cover at the upper end and a second hemispherical cover at the lower end. The first hemispherical cover is bonded with the second hemispherical cover by glue or connected by snap or screw structure. The interior of the first tube body, the first hole, and the inside of the liner form a first wiring passage, the first wiring passage connects to the upper cavity. The interior of the second tube body, the second hole, and the inside of the liner form a second wiring passage, and the second wiring passage connects to the lower cavity.

The plurality of the splicing blocks include two fixed splicing blocks and a plurality of movable splicing blocks. The two fixed splicing blocks are a first fixed splicing block and a second fixed splicing block. The first fixed splicing block is disposed outside the first tube body on the surface of the liner and connected to the first tube body; and the second fixed splicing block is disposed outside the second tube body on the surface of the liner and connected to the second tube body.

In one embodiment of the present invention, as the traditional Rubik's Cube, there are 24 movable splicing blocks including an upper splicing group composed of 8 splicing blocks, a middle splicing group composed of 8 splicing blocks, and a lower splicing group composed of 8 splicing blocks. The middle splicing group sits between the upper splicing group and the lower splicing group. The upper splicing group surrounds the first fixed splicing block, and the lower splicing group surrounds the second fixed splicing block, and the first fixed splicing block and the second fixed splicing block limit all the movable splicing blocks. Two adjacent splicing blocks are mutually coupled.

In the present invention, each splicing block comprises a block body, an interlocking section that is connected to the block body, a groove installed between the interlocking section and the block body, and an outer surface of the interlocking section that matches the contour of the outer surface of the liner.

In the present invention, one of skilled in the art may design the magic cube with different numbers of splicing blocks according to the size of the cubes based on the same principle as the traditional 26-splicing block Rubik's Cube.

In the present invention, the speaker comprises a printed circuit board (PCB) substrate, a controller mounted on the printed circuit board substrate, a Bluetooth module electrically connected to the controller, a loudspeaker electrically connected to the controller, a battery electrically connected to the controller, and optionally an LED lighting module electrically connected to the controller. The printed circuit board substrate is disposed inside the cavity and divides the cavity into an upper cavity and a lower cavity; the battery is disposed in the lower cavity, and the loudspeaker is disposed in the upper cavity.

In the present invention, the controller plays music by accepting the control signal of the button, and the tapping interval frequency of the button can control more signals, thereby implement one-button with multi-functions. For example, pressing once to power up, pressing twice to play the next song, pressing three times to play the previous song, long press to shutdown, and so on. The loudspeaker is for broadcasting the sound signal of the controller. Optionally, the LED illuminating module is used to emit the light of the whole magic cube module, which makes the whole integrated magic cube speaker more aesthetically pleasing and enables it to be played at night. The magic cube speaker of the present invention functions as a Bluetooth speaker and player where it not only has the control button to control the play modes as a Bluetooth player but also acts as an acoustic loudspeaker to broadcast the sound thereof based on the control signals of various play modes.

In the present invention, the charging interface comprises a positive electrode disposed in the middle and a negative electrode disposed at the edge. The negative electrode comprises a main body having a plurality of plate-shaped negative electrode sockets in a circular array and a tubular body disposed at the lower end of the main body. A circular hole extends from the main body toward the tubular body in the middle of the negative electrode. The outer surface of the tubular body has an external screw structure that matches the inner screw structure of the liner. The positive electrode is disposed in the circular hole, and an insulator is disposed between the positive electrode and the negative electrode. The negative electrode of the charging interface is electrically connected to the negative electrode of the battery; and the positive electrode is electrically connected to the positive electrode of the battery.

The inside of the block body of the first fixed splicing block has a first space that is fit with the button; and the inside of the block body of the second fixed splicing block has a second space installed with the charging interface. Thus, the button is installed in the first space, and the charging interface is fixed and mounted in the second space.

To improves the sound quality and facilitate sound control, the liner has multiple sound transmission holes that connects the inside and outside of the liner. At least one of the splicing blocks has one or more sound passages, and each of the sound passages comprises a sound inlet port, a sound outlet port, and a middle section between the sound inlet and outlet ports. The middle section is disposed in the hollow space inside the splicing block; the sound inlet port is disposed in the center of the interlocking section and connecting the middle section to the sound hole; and the sound outlet port is the sound hole of the side wall of the splicing block or any one or a combination of several micro holes arranged in an array on the surface of the splicing block.

The controller is electrically connected with an antenna, a memory storage device, a status indicator, and a microphone. The charging interface is electrically connected to the battery via a charging circuit. The charging indicator is electrically connected to the charging circuit. When the data cable or charging stand supplies power to the charging interface, the charging circuit charges the battery, and the charging indicator lights up during charging. The battery has an internal power detecting circuit.

The microphone accepts external sound signals. When the microphone receives the external sound signal, the controller receives the control signal from the microphone, performs internal analysis, and determines whether the controller controls the speaker to play music or the change of the play mode. The cavity inside the liner, the sound transmission holes, the sound inlet, the hollow space inside the block body, and the sound outlet of the side wall cooperate to form a first sound transmission channel. The cavity inside the liner, the sound transmission holes, the sound inlet, the hollow space inside the block body, and the plurality of the micro holes cooperate to form a second sound transmission channel. In the present invention, it may apply only the first sound transmission channel, or only the second sound transmission channel, or both of them at the same time.

A sound guiding cone is installed inside the cavity. The lower end of the sound guiding cone has a conical curved surface. The diameter of the cross section on the upper end of the conical curved surface is larger than that on the lower end of the conical curved surface, and the conical curved surface is used for refracting the sound. When the speaker inside the liner makes a sound, and one part of the sound is directly transmitted from the sound hole, another part of the sound is refracted through the sound guide cone, and then, transmitted from the sound hole. The sound coming out of the sound hole enters the sound inlet of the splicing block; after the sound passing through the middle section, one part of the sound is transmitted from the sound outlet on the side wall, and another part is transmitted from the micro holes, then the sound gets to the human's ear. If the sound is transmitted from the sound outlet of the side wall, the sound is finally transmitted from the gap between two adjacent splicing blocks to human's ears. The lower cavity below the printed circuit board substrate forms a sound cavity, which makes the sound quality better. The upper and lower cavities connect with each other. The sound transmission of the entire magic cube module in the middle splicing group and the upper splicing group is relatively smooth, so the sound is better. In the lower splicing block, since the position of the sound hole is not so close to the position of the sound inlet port of the lower splicing group, the sound is not as good as that from the middle splicing group, but there is only a very little difference. On the circumference of the first fixed splicing block and the circumference of the second fixed splicing block, the position between the sound input port and the sound port are not close to the position of the sound input port of the middle splicing block, so the sound from the splicing block in the middle splicing group is the best.

Further, the lower cavity of the liner may comprise at least one through hole that penetrates from the inside of the lower cavity to the outside of the liner so that the effect of the sound cavity is improved. As an optimization, the printed circuit board substrate between the upper and lower cavities may further comprise a linking hole that connects the upper cavity to the lower cavity, then, the effect of the sound cavity is even better.

Moreover, the inside of the sound guiding cone may be a hollow or solid structure, and preferably, a hollow structure, which saves cost and reduces weight. The sound guiding cone may be made of plastic or metal material; plastic material is lighter and easier to use.

Furthermore, the sound guiding cone is fixedly connected to the liner through a linking strip. The linking strip and the sound guiding cone may be integrally formed as a whole, or they may be glued together by a bonding material, or integrated by welding, or integrated by a snap structure. The linking strip is placed between the two adjacent sound ports so that it doesn't affect the sound transmission.

During the process of electrical conduction, the wire does not get tangled up or even broken during to the rotation of the magic cube module, because the metal nut is mounted on the liner, the negative electrode is mounted on the metal nut, the lower end of the negative electrode is a metal screw rod, and the metal screw rod and the metal nuts are connected to each other by a screw structure. The upper end of the negative electrode has a metal ring, and the upper end of the metal ring has a flat surface. The positive electrode is a solder joint mounted on the substrate, the substrate is insulating. The back surface of the substrate is welded with a wire to form the positive electrode cable. The metal screw rod and the liner are relatively stationary, and the negative electrode has a perforation inside which is convenient for the positive electrode cable to pass through to the liner. The negative electrode is connected to the metal screw rod through the metal ring, and then connected to the metal nut. The negative electrode cable can be directly connected to the liner by welding the negative electrode cable. When the portable charger or the charging stand is used, it is simply to insert the interface into the board on the top of the positive electrode and the negative electrode. The positive electrode hole is arranged in the middle of the board, and four negative electrode holes are in a rectangular array surrounding the positive electrode on the board. The pins of the interface are inserted into the corresponding positive electrode hole and the negative electrode hole to form a connection, and there is no wire tangle problem when the magic cube rotates.

The magic cube speaker of the present invention may be directly charged by using a data cable that is connected to the charging interface to charge the battery inside the magic cube speaker. Alternatively, the integrated magic cube speaker of the present invention may be charged on a charging stand.

The present invention further provides a charging stand for the magic cube speaker. The charging stand comprises a stand body, a plug mounted on the base body, and a USB interface electrically connected to the charging plug. The speaker of the magic cube speaker is electrically connected to the charging interface, the charging interface is fixedly mounted on one of the splicing blocks, and the charging interface and the charging plug are matched. The charging stand has a recessed area that matches the magic cube speaker for placing the magic cube speaker thereon. The charging plug is placed at the recessed area. When the charging stand charges the battery inside the integrated magic cube speaker, it converts the municipal DC voltage (110-220V) into a DC 5V power supply through the transformer, and transfers to the charging interface of the integrated magic cube speaker.

After the charging is completed, the magic cube speaker of the present invention can be directly used. The function of the speaker can be controlled by the button; alternatively, the speaker can be controlled by a mobile terminal, which may be a mobile phone. The magic cube speaker of the present invention may further comprise a handheld terminal. The handheld terminal communicates with the integrated magic cube speaker of the present invention through wireless signals.

The present invention further provides a portable charging block for the magic cube speaker. The charging block includes a casing, a charging component fixedly mounted on the bottom of the casing, and a data cable interface fixedly mounted on the side wall of the casing. The charging component is electrically connected to the data cable interface while matching with the charging interface of the integrated magic cube speaker.

The present invention further provides a method for controlling the integrated magic cube speaker. When using the magic cube module, the speaker may be controlled by a button, and the speaker generates a sound inside the cavity. In the method of the present invention, when the user presses a button, the controller receives the control signal of the button, the controller internally stores pre-stored data, the controller reads the internal pre-stored data, and plays the sound signal through the speaker. The battery inside the speaker is charged through the contact between the charging stand and the charging interface. The mobile terminal communicates with the Bluetooth module inside the speaker through the wireless communication, the controller reads the signal from the Bluetooth module, performs internal analysis, and then the controller uses the speaker to play out the data stored in the memory through the speaker.

The magic cube speaker of the present invention is small in size, easy to control, can be charged, and have good sound quality. The magic cube speaker has the advantages of simple design, long service life, and easy for production.

BRIEF DESCRIPTION OF DRAWINGS

FIG. 1A shows a view of the side of the magic cube module with a charging interface; FIG. 1B shows a view of one side of the magic cube module; and FIG. 1C shows a view of the side of the magic cube module with a button.

FIG. 2A is an exploded view showing the plurality of the splicing cubes; FIG. 2B is a partial enlarged view of the upper group of the splicing blocks as shown in FIG. 2A, including the first fixed splicing block with the button; FIG. 2C is a partial enlarged view of the middle group of the splicing blocks as shown in FIG. 2A; FIG. 2D is a partial enlarged view of the lower group of the splicing blocks as shown in FIG. 2A, including the second fixed splicing block with the charging interface; FIG. 2E shows the structure of one splicing block; and FIG. 2F is a sectional view showing the structure of the splicing blocks in the magic cube module.

FIG. 3A shows the side view of the charging stand; FIG. 3B shows the back view of the charging station; FIG. 3C shows the front view of the charging station; and FIG. 3D shows the bottom view of the charging station.

FIGS. 6A to 6C show the structure of the liner of the magic cube speaker of the present invention, where FIG. 6A shows the side view of the liner; FIG. 6B shows the top view of the liner; and FIG. 6C shows the bottom view of the liner.

Reference numbers are used in the FIGS. 1A to 13 as follows:
1—magic cube module; 2—speaker; 3—button; 4—charging stand; 5—handheld/mobile terminal; 11—liner; 12—splicing block; 21—print circuit board substrate; 40—controller; 41—base; 42—charging plug; 43—USB interface; 44—charging interface; 45—recessed area; 50—Bluetooth module; 60—loudspeaker; 70—LED lighting module;
111—cavity; 111a—upper cavity; 111b—lower cavity; 112—first tube body; 112a—first hole; 113—second tube body; 113a—second hole; 114—first hemispherical cover; 115—second hemispherical cover; 121—first fixed splicing block; 122—second fixed splicing block; 123—movable splicing block; 1211—block body; 1212—groove; 1213—interlocking section; 1214—outer surface of interlocking section;
100—positive electrode; 200—negative electrode; 300—insulator; 400—battery; 2001—main body of negative electrode; 2002—tubular body; 2003—outer screw structure; 2004—circular hole;
500—portable charging block; 503—data cable; 5001—housing; 5002—charging assemble; 5003—data cable interface; 610—sound transmission hole; 6100—sound inlet (port); 6200—middle section; 6300—sound outlet (port); 6301—sound hole; 6302—micro hole; 7100—sound guiding cone.

DETAILED DESCRIPTION OF INVENTION

The present invention is further explained and described in details in connection with FIGS. 1A to 13.

Figure 1A:
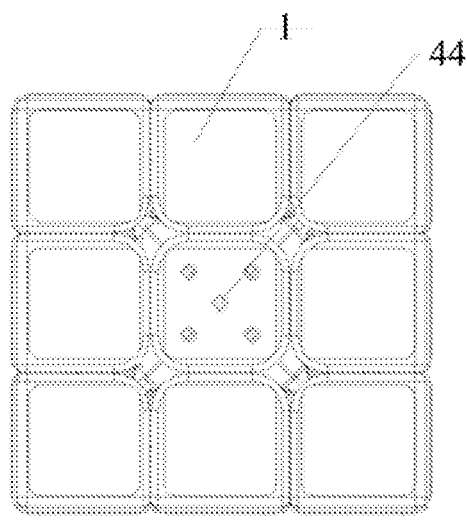
FIGS. 1A to 1C show the structure of magic cube module in the magic cube speaker of the present invention, where
Figure 1B:
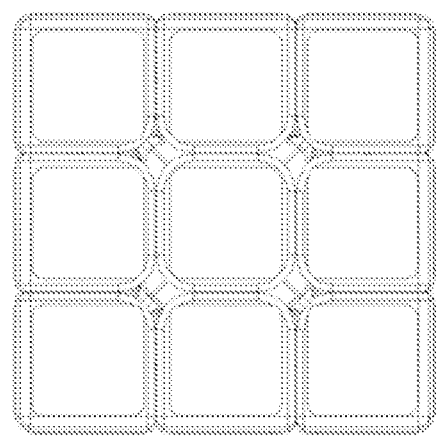
Figure 1C:
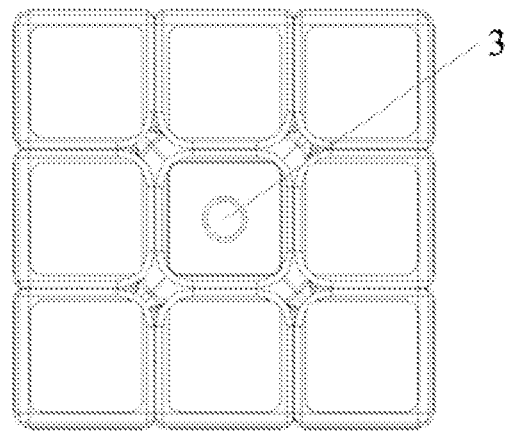

As shown in FIGS. 1A to 1C, the integrated magic cube speaker of the present invention comprises magic cube module 1 having charging interface 44 on one side and button 3 on another side of the magic cube.

Figure 2A:
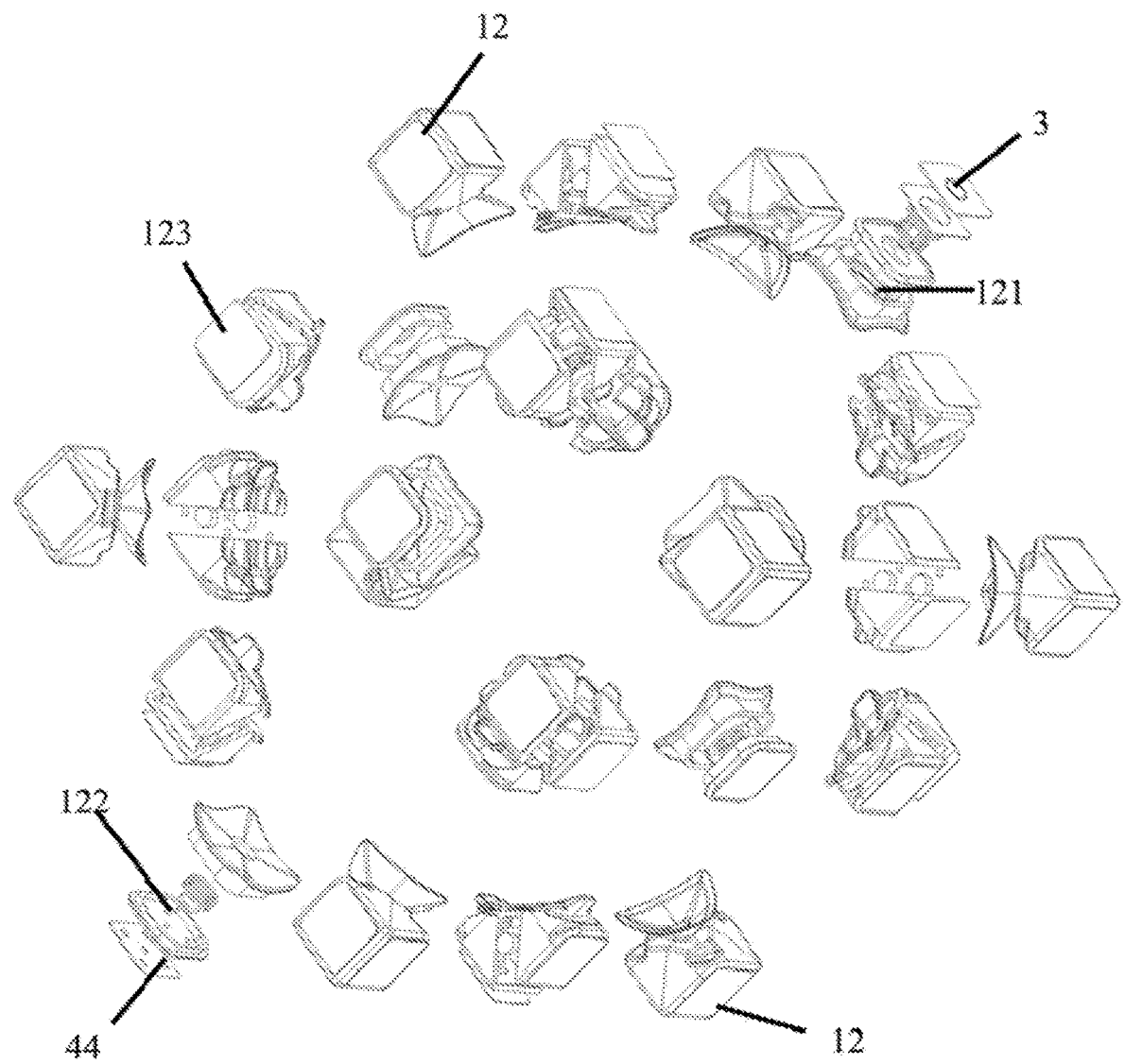
FIGS. 2A to 2F show the structure of the splicing blocks in the magic cube speaker of the present invention, where
Figure 2B:
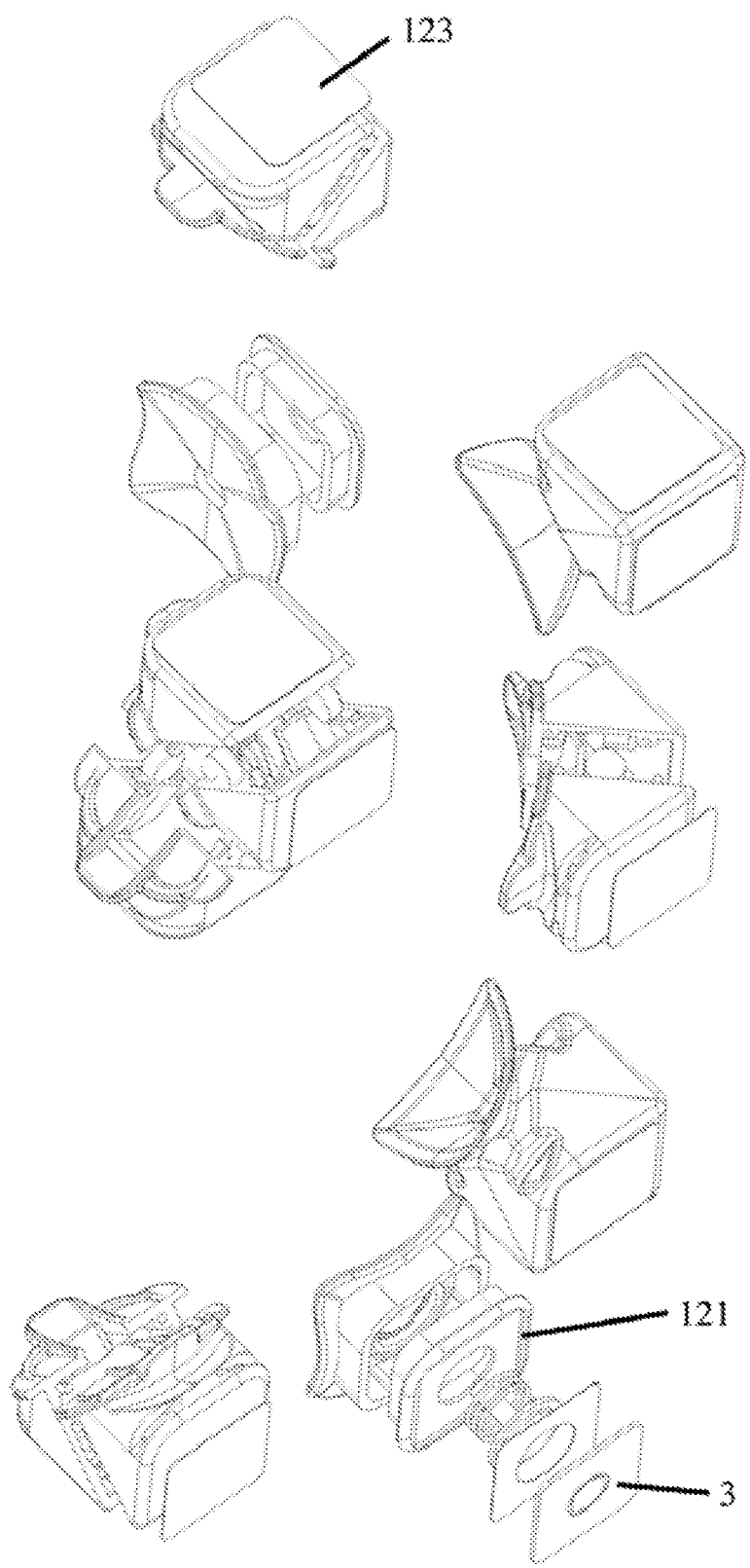
Figure 2C:
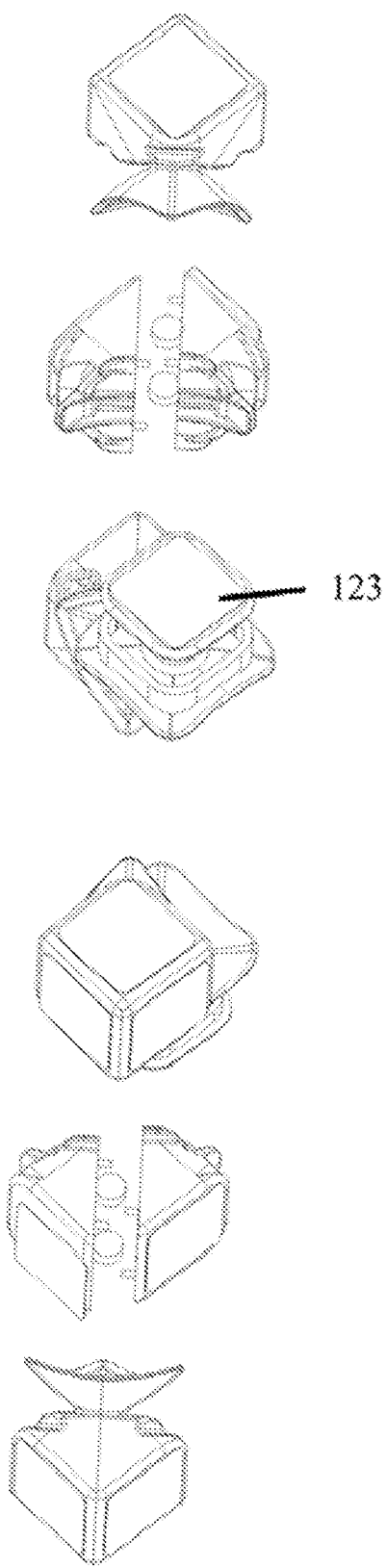
Figure 2D:
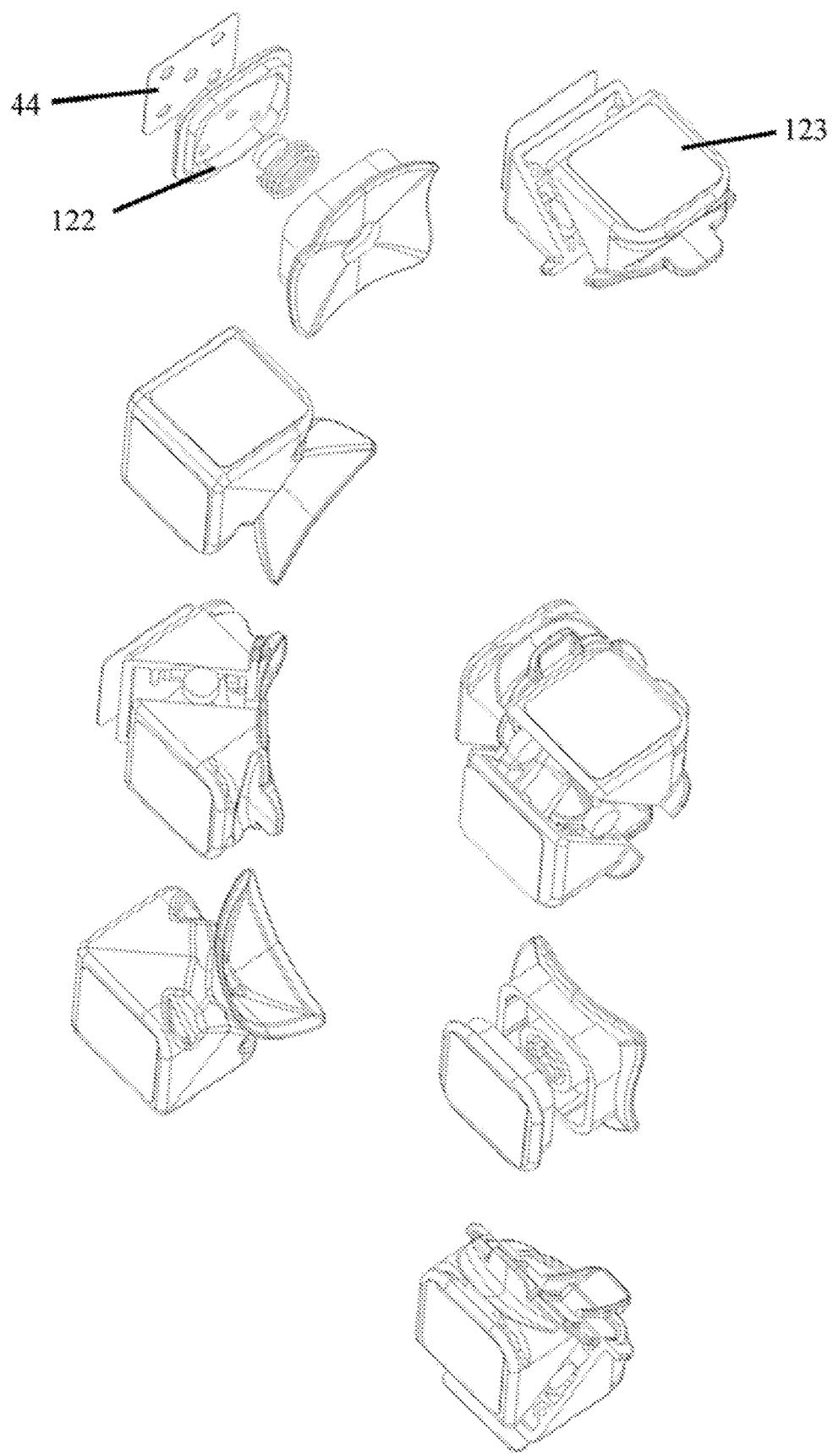
Figure 2E:
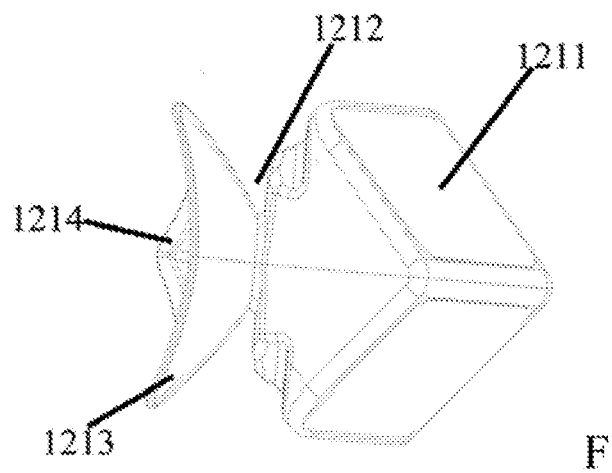
Figure 2F:
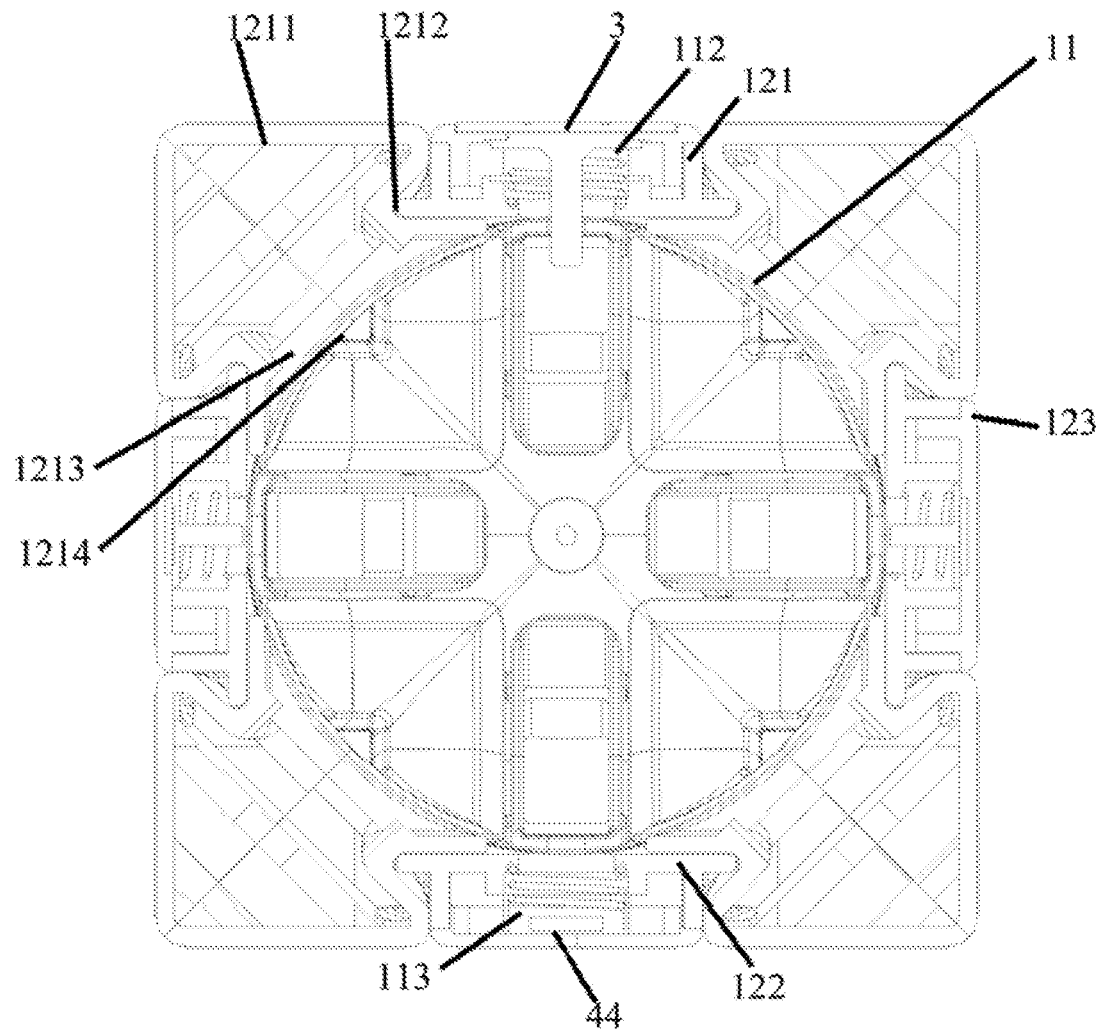
Figure 3A:
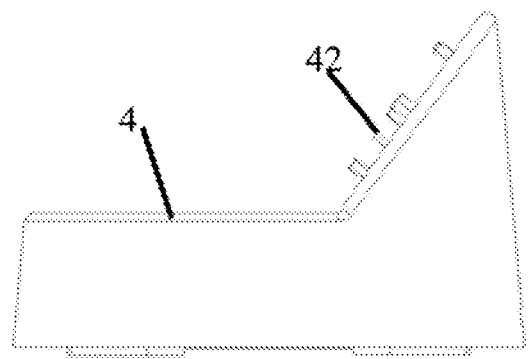
FIGS. 3A to 3D show different views of the charging stand of the present invention, where
Figure 3B:
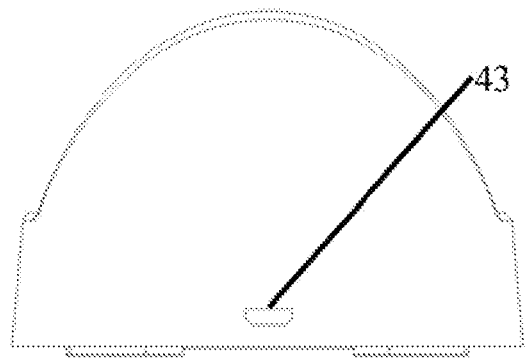
Figure 3C:
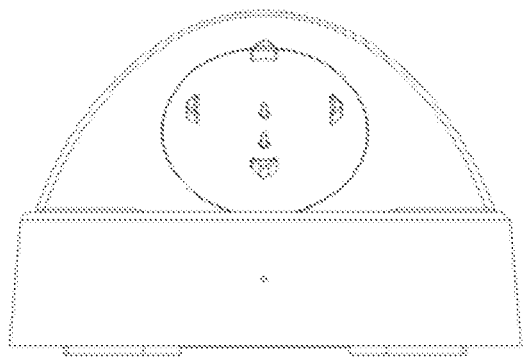
Figure 3D:
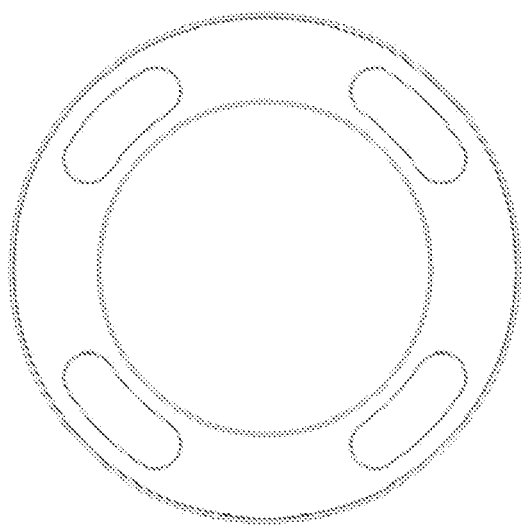
Figure 4:
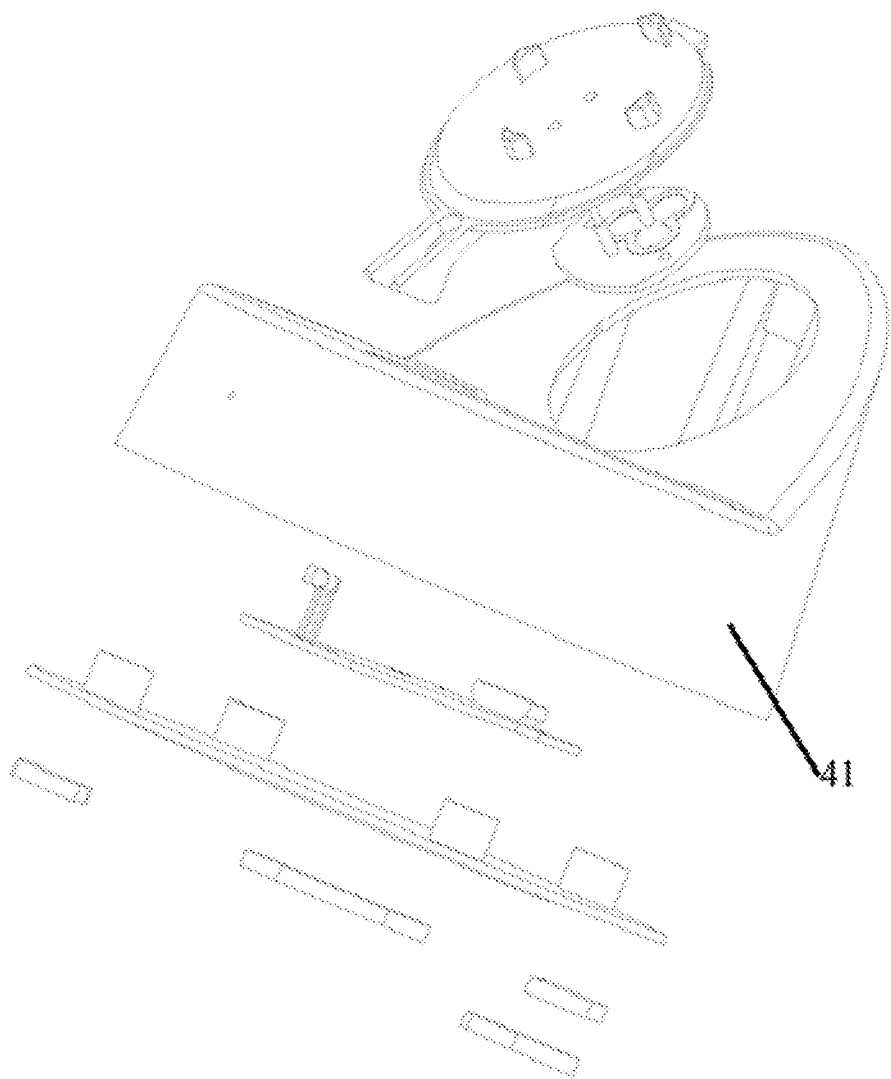
FIG. 4 is an exploded view showing the charging stand of the present invention.
Figure 7:
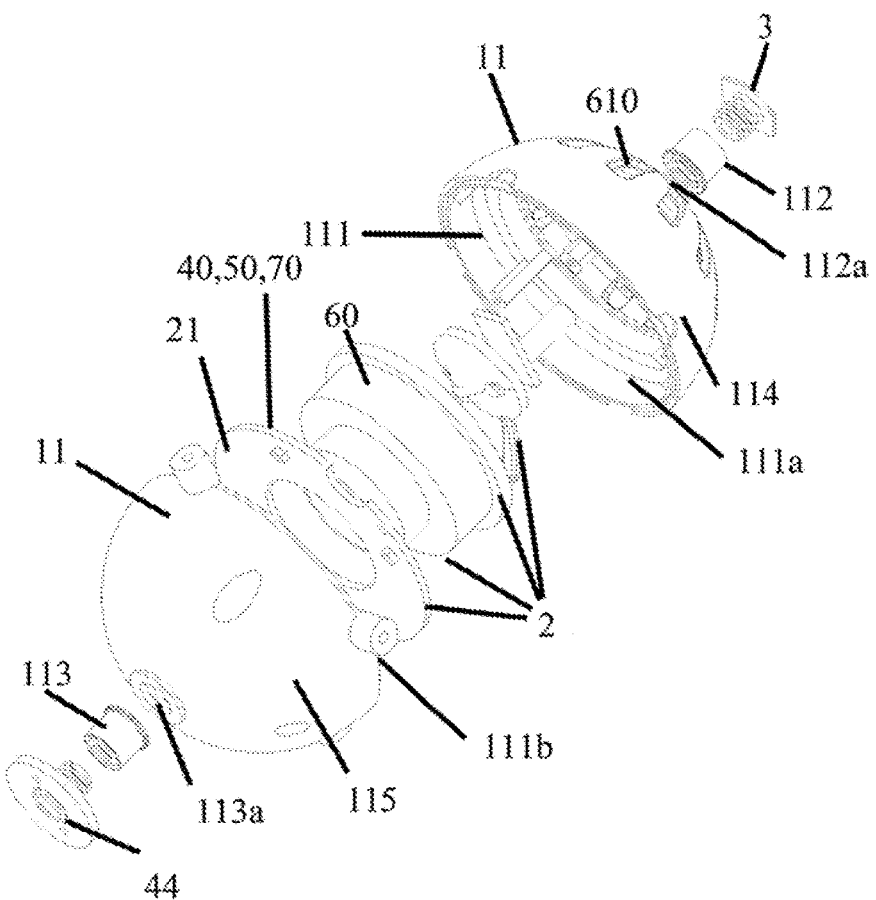
FIG. 7 is an exploded view showing the structure of the liner and speaker of the magic cube speaker of the present invention.

As shown in FIGS. 2A to 2F, magic cube module 1 comprises liner 11 and a plurality of splicing blocks 12 disposed on the surface of liner 11. As shown in FIG. 7, cavity 111 is disposed inside liner 11; and speaker 2 is disposed inside cavity 111. As shown in FIGS. 2B, 2F, and 7, button 3 is fixedly mounted to one of the splicing blocks 12 and electrically connected to speaker 2.

Figure 10:
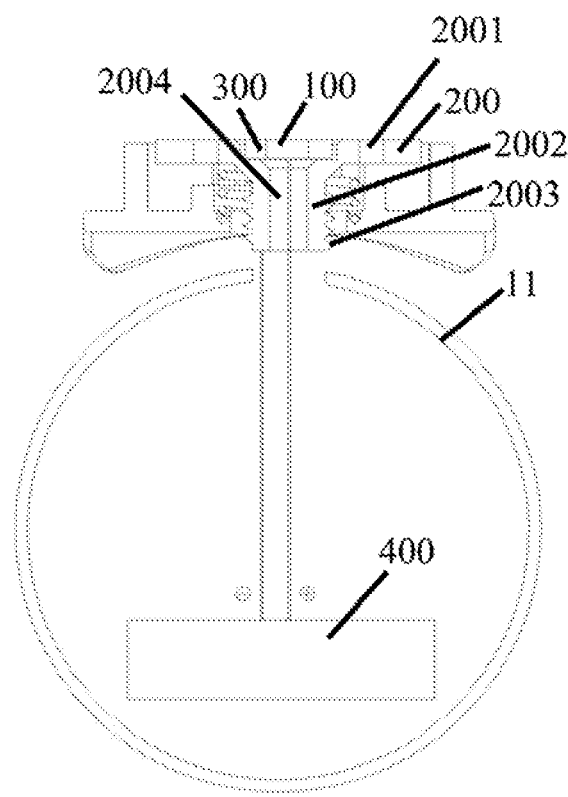
FIG. 10 shows one embodiment of the charging interface of the present invention where the charging interface connects to the battery inside the liner.
Figure 12:
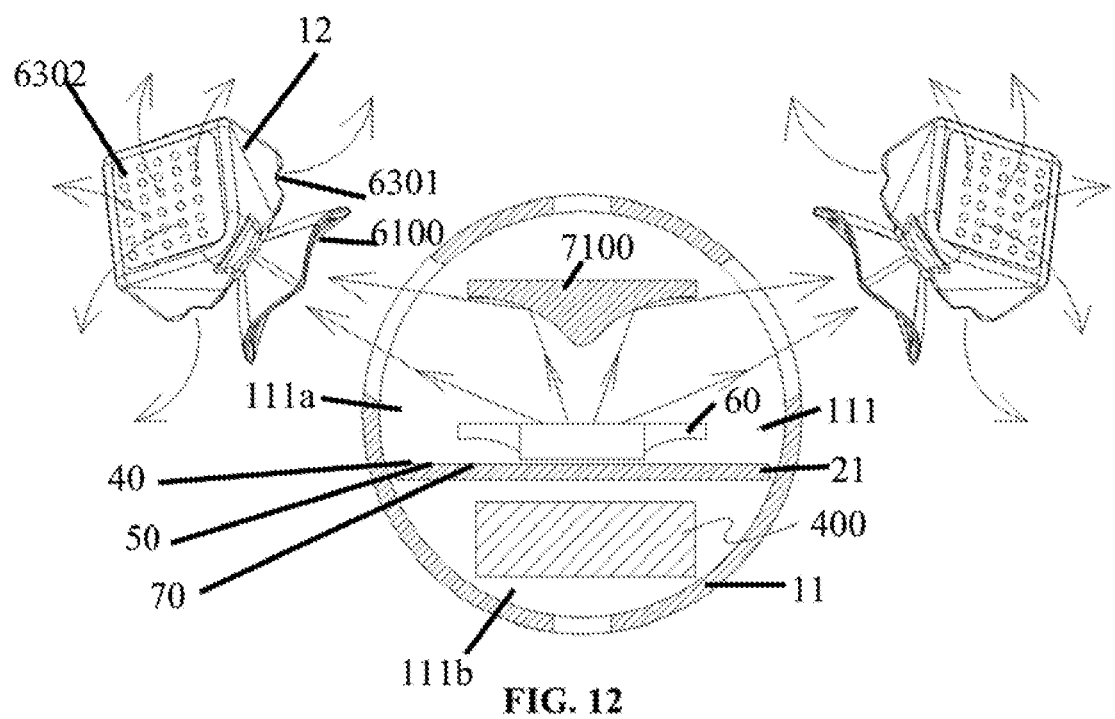
FIG. 12 is a schematic diagram showing the working principle of the sound direction in the magic cube speaker of the present invention.
Figure 13:
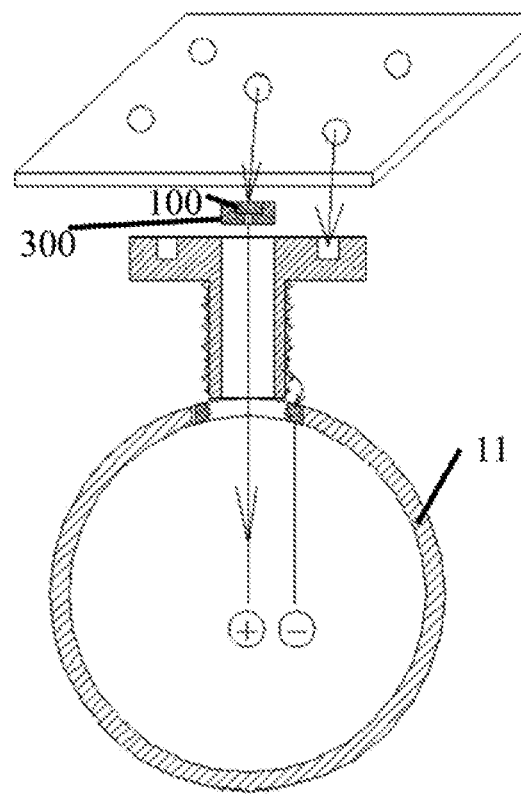
FIG. 13 shows wire connection and electron transport in the partial structure of the magic cube speaker of the present invention.

As shown in FIGS. 7, 10, and 12, speaker 2 comprises printed circuit board (PCB) substrate 21, controller 40 fixedly mounted on printed circuit board substrate 21, Bluetooth module 50 electrically connected to controller 40, loudspeaker 60 electrically connected to controller 40, LED lighting module 70 electrically connected to controller 40, and battery 400 electrically connected to controller 40.

As shown in FIGS. 7 and 12, printed circuit board substrate 21 is disposed inside cavity 111 and divides cavity 111 into upper cavity 111a and lower cavity 111b. Battery 4 is disposed in lower cavity 111b, and speaker 2 is disposed in upper cavity 111a.

As shown in FIGS. 6A to 7, liner 11 has a circular shape and has hollow structure inside. The upper end of liner 11 has first hole 112a, and the lower end of liner 11 has second hole 113a. The upper end of first hole 112a has first tube body 112, and the lower end of second hole 113a has second tube body 113. First tube body 112 connects to liner 11 through first hole 112a, and second tube body 113 connections to liner 11 through second hole 113a. Liner 11 further comprises first hemispherical cover 114 on the upper half and second hemispherical cover 115 on the lower half. First hemispherical cover 114 and second hemispherical cover 115 are glued by glue or connected by a snap or screw structure. The inside of first tube body 112, first hole 112a, and the inside of liner 11 form a first wiring passage that connects to upper cavity 111a; and the inside of second tubular body 113, second hole 113a, and the inside of liner 11 form a second wiring passage that connects to lower cavity 111b.

As shown in FIG. 2A, in one embodiment of the present invention, the plurality of the splicing blocks 12 include two fixed splicing blocks 121 and 122 and twenty-four movable splicing blocks 123. Two fixed splicing blocks are first fixed splicing block 121 and second fixed splicing block 122.

As shown in FIGS. 2B, 2F, and 7, first fixed splicing block 121 is disposed at the surface of liner 11 outside first tube body 112, and first fixed splicing block 121 and first tube body 112 are fixedly connected.

As shown in FIGS. 2D, 2F, and 7, second fixed splicing block 122 is disposed on the surface of liner 11 outside second tube body 113, and second fixed splicing block 122 and second tube body 113 are fixedly connected.

As shown in FIGS. 2A to 2D, 24 active splicing blocks 123 include an upper splicing group made up of 8 active splicing blocks 123 as shown in FIG. 2B, a middle splicing group made up of 8 active splicing blocks 123 as shown in FIG. 2C, and a lower splicing group made up of 8 active splicing blocks 123 as shown in FIG. 2D. The middle splicing group is between the upper splicing group and the lower splicing group. The upper splicing group surrounds first fixed splicing block 121 as shown in FIG. 2B, and the lower splicing group surrounds second fixed splicing block 122 as shown in FIG. 2D. First fixed splicing block 121 and second fixed splicing block 122 confine all the active splicing blocks 123. Each adjacent two splicing blocks 12 are mutually coupled. As shown in FIGS. 2E and 2F, each splicing block 12 comprises a block body 1211 and an interlocking section 1213 that is connected to block body 1211. A groove 1212 is made between interlocking section 1213 and block body 1211. Outer surface 1214 of interlocking section 1213 and the outer surface contour of liner 11 are fitted to each other.

As shown in FIGS. 3A to 5, the integrated magic cube speaker of the present invention further comprises a charging stand 4 that has a base 41, a charging plug 42 fixedly mounted on base 41, and a USB interface 43 electrically connected to charging plug 42. As shown in FIGS. 2A, 2D, and 7, speaker 2 is electrically connected to charging interface 44 which is fixedly mounted on one of the splicing blocks 12, and charging interface 44 matches with charging plug 42. Charging stand 4 has recessed area 45 for placing the magic cube module 1, and charging plug 42 is disposed in recessed area 45.

Figure 11:
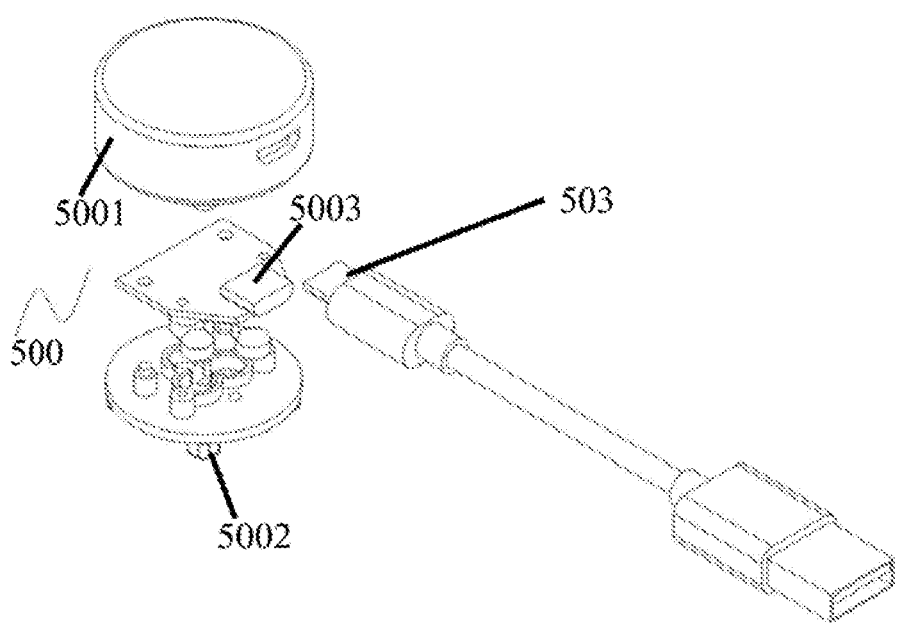
FIG. 11 is a partially exploded view showing the working principle of the parts of the charging block of the present invention.

As shown in FIG. 11, the integrated magic cube speaker of the present invention further comprises a portable charging block 500 which consists of a housing 5001, a charging assembly 5002 fixedly mounted on the bottom of housing 5001, and data cable interface 5003 fixedly mounted on the side wall of housing 5001. Charging assembly 5002 is electrically connected with data cable interface 5003 and matches with charging interface 44 of speaker 2.

As shown in FIG. 10, charging interface 44 comprises positive electrode 100 disposed in the middle and negative electrode 200 disposed at the edge. Negative electrode 200 comprises a main body 2001 that is in the shape of a plate and has a plurality of negative electrode sockets arranged in a circular array thereon and a tubular body 2002 disposed at the lower end of main body 2001. Circular hole 2004 extends from main body 2001 toward tubular body 2002 in the middle of negative electrode 200. Outer screw structure 2003 is on the outer surface of tubular body 2002, and liner 11 has an inner screw structure that matches with external screw structure 2003. Positive electrode 100 is disposed in circular hole 2004. 2 300 is placed between positive electrode 100 and negative electrode 200. Negative electrode 200 of charging interface 44 is electrically connected to negative electrode of battery 400. Positive electrode 100 is electrically connected to positive electrode of battery 400.

As shown in FIG. 11, the size of charging block 500 is smaller than that of the magic cube module 1. When data cable 503 is inserted into data cable interface 5003 and the other end of data cable 503 is inserted into a handheld terminal or mobile power source, it can charge battery 400 inside magic cube module 1. If it is indoors, batter 400 can be charged using charging stand 4. Charging stand 4 can be used to charge battery 400 inside liner 11 through data cable 503 connected to a computer, a DC transformer, a DC socket, and the like.

Figure 5:
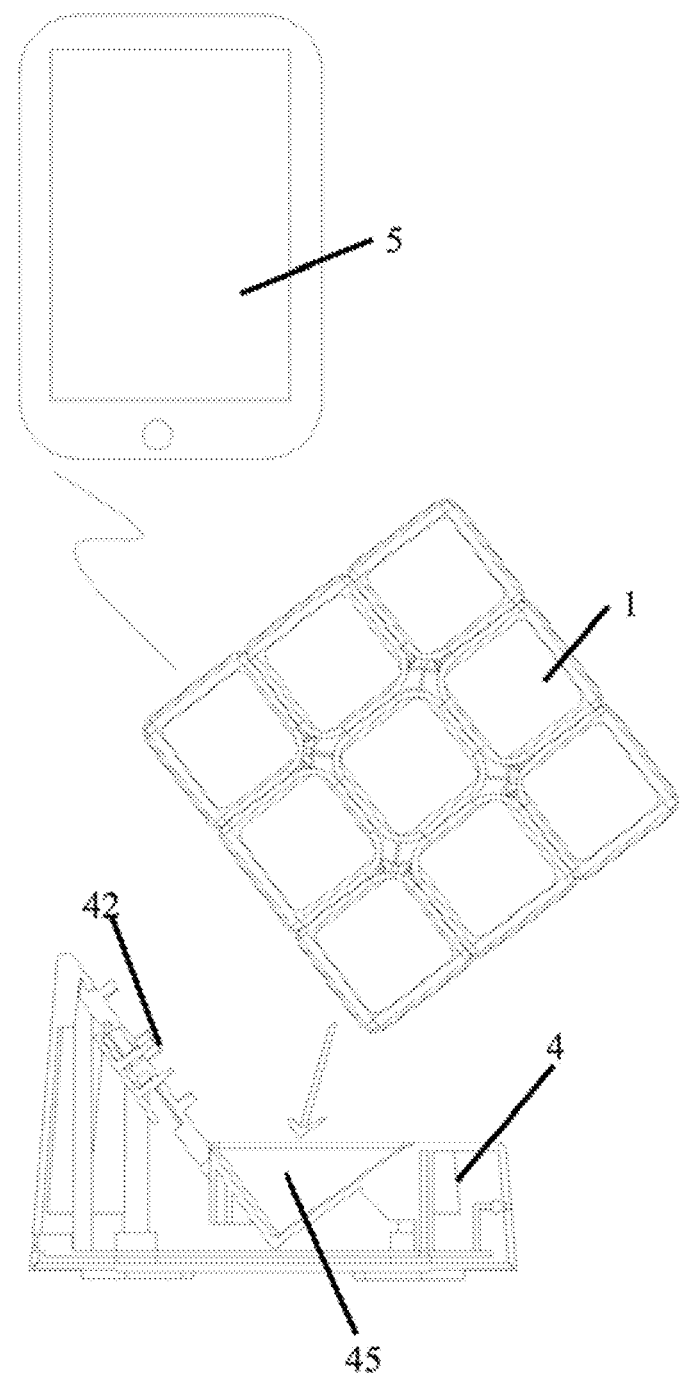
FIG. 5 is a schematic drawing showing interaction and coordination of the charging stand, magic cube module, and the mobile terminal with each other in the present invention.

As shown in FIG. 5, the integrated magic cube speaker of the present invention further comprises handheld terminal 5. Handheld terminal 5 and speaker 2 are communicatively connected by wireless signals.

As shown in FIGS. 2A to 2F, a first space is disposed in block body 1211 of the first fixed splicing block 121 for mounting button 3. A second space is disposed in block body 1211 of the second fixed splicing block 122 for mounting charging interface 44. Button 3 is fixedly installed in the first space, and the charging interface 44 is fixedly installed in the second space.

Figure 8:
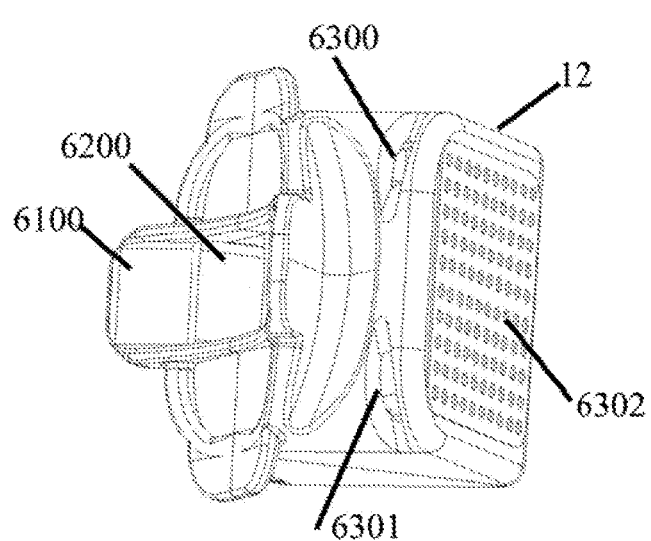
FIG. 8 shows the structure of the splicing block of the present invention for sound transmission.

As shown in FIG. 7, liner 11 has a plurality of sound transmission holes 610, and sound transmission holes 610 connect the inside and outside of liner 11. As shown in FIG. 8, at least one of splicing blocks 12 has at least one sound passage that comprises sound inlet port 6100, sound outlet port 6300, and middle section 6200 in-between. Middle section 6200 is in the hollow space inside the splicing block 12; sound inlet port 6100 is in the center of interlocking section 1213, which connects middle section 6200 to sound transmission hole 100; and sound outlet port 6300 is disposed on sound hole 6301 of the side wall on the splicing block 12 or any one or a combination of the plurality of micro holes 6302 arranged in an array on the surface of splicing block 12 as shown in FIG. 9.

Controller 40 is electrically connected with an antenna, a memory storage device, a status indicator, and a microphone. A charging circuit is electrically connected between the charging interface 44 and the battery 400, a charging indicator is electrically connected to the charging circuit. Cavity 111 inside liner 11, sound transmission hole 100, sound inlet 6100, hollow space of middle section 6200 inside block body 1211, and sound hole 6301 on the side wall cooperate to form a first sound transmission channel. Cavity 111, sound transmission hole 100, sound inlet port 6100, hollow space of middle section 6200 inside block body 1211, and plurality of micro holes 6302 cooperate to form a second sound transmission channel. In the present invention, sound may be transmitted through the first sound transmission channel or the second sound transmission channel as the only transmission channel, or through both at the same time. Sound hole 6301 on the side wall is on the surface of block body 1211 which is between main body and interlocking section 1213.

Figure 9:
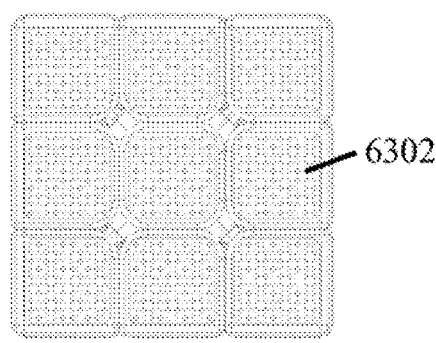
FIG. 9 shows one side of the magic cube module of the present invention having the microporous structure with micro holes.

As shown in FIGS. 8 and 9, the plurality of micro holes 6302 are on the surface that can be touched by the user when the magic cube speaker is in use. The number of sound holes on the side wall of block body 1211 can be freely set according to requirements and plurality of sound holes may be used.

As shown in FIG. 12, sound guiding cone 7100 is installed inside cavity 111, and the lower end of the sound guiding cone 7100 has a conical curved surface. The diameter of the cross section on the upper end of the conical curved surface is larger than that on the lower end of the conical curved surface, and the conical curved surface is used for refracting the sound. When loudspeaker 60 inside liner 11 makes sound, and one part of the sound is directly transmitted through sound hole 100, another part of the sound is refracted through sound guide cone 7100 and then transmitted through sound hole 100. The sound coming out of sound hole 100 enters sound inlet port 6100 of splicing block 12. After the sound passing through the middle section 6200, one part of the sound is transmitted from sound outlet 6301 on the side wall, and another part is transmitted from micro holes 6302, then gets to the human's ears. If the sound is transmitted from sound outlet 6301 of the side wall, the sound is finally transmitted from the gap between adjacent two splicing blocks 12 to the human's ears. Lower cavity 111b below printed circuit board substrate 21 forms a sound cavity, which makes the sound quality better. Upper cavity 111a and lower cavity 111b are connected with each other.

During electrical conduction, wires d not get tangled up or even broken during rotation of magic cube module 1, because the metal nut is mounted on liner 11, negative electrode 200 is mounted on the metal nut, lower end of negative electrode 200 is a metal screw rod, and the metal screw rod and the metal nuts are connected to each other by a screw structure. Upper end of negative electrode 200 has a metal ring, and the upper end of the metal ring has a flat surface. Positive electrode 100 is a solder joint mounted on the substrate, the substrate is an insulator. Back surface of the substrate is welded with a wire, and it is the positive electrode cable. The metal screw rod and liner 11 are relatively stationary, and negative electrode 200 has a perforation, which is convenient for positive electrode cable to pass through to liner 11. Negative electrode 200 is connected to the metal screw rod through the metal ring, and then connected to the metal nut. Negative electrode cable can be directly connected to liner 11 by welding the negative electrode cable. When the portable charger or charging stand is used, it is simply to insert the interface into the board on the top of the positive electrode and the negative electrode. The positive electrode hole is arranged in the middle of the board, and four negative electrode holes are in a rectangular array surrounding the positive electrode on the board. The pins of the interface are inserted into the corresponding positive electrode hole and the negative electrode hole to form a connection, and there is no wire tangle problem when the magic cube speaker rotates.

The method for controlling the integrated magic cube speaker of the present invention comprises the step of, when using magic cube module 1, speaker 2 is controlled by button 3 to generate a sound inside cavity 111.

As shown in FIGS. 5 and 12, in the process for controlling the integrated magic cube speaker of the present invention, the user presses button 3, and controller 40 receives control signal from button 3. Controller 40 has internally pre-stored data, reads the internal pre-stored data, and plays the sound signal through speaker 2. Battery 400 inside speaker 2 is charged through the contact between charging stand 4 and charging interface 44. Mobile terminal 5 communicates with Bluetooth module 50 inside speaker 2 through wireless communication. Controller 40 reads the signal from Bluetooth module 50, performs internal analysis, and then controller 40 uses speaker 2 to play out the data stored in the memory through speaker 2.

The present invention has the functions of magic cube and speaker at the same time, it does not affect the use of each other. It is small in size, easy to control. It can be charged, with good sound quality, simple structure, reasonable structure layout, easy production, and long service life.

I claim:

1. A magic cube speaker, comprising
a magic cube module, the magic cube module comprising a liner, the liner comprising multiple sound transmission holes that connects inside and outside of the liner, splicing blocks installed on outside surface of the liner, and a cavity formed in an interior of the liner;
a speaker installed inside the cavity, the speaker comprising a printed circuit board substrate, a controller mounted on the printed circuit board substrate, a short-range wireless communication module mounted on the printed circuit board substrate and electrically connected to the controller, a loudspeaker electrically connected to the controller, a battery electrically connected to the controller, the battery comprising a positive electrode and a negative electrode, and optionally an LED lighting module mounted on the printed circuit board substrate and electrically connected to the controller;
a charging interface being fixedly mounted on one of the splicing blocks, the charging interface further comprising a positive electrode and a negative electrode and being matched with a charging plug; and
a button mounted to one of the splicing blocks and electrically connected to the speaker,
wherein the printed circuit board substrate of the speaker divides the cavity inside the liner into an upper cavity and a lower cavity; the battery is disposed in the lower cavity, and the loudspeaker is disposed in the upper cavity;
the liner comprises an upper end, a first hemispherical cover covering the upper end, a lower end, and a second hemispherical cover covering the lower end, and the first hemispherical cover is bonded with the second hemispherical cover;
the upper end of the liner comprises a first hole, a first tube body at upper end of the first hole and connecting to the liner through the first hole, and the lower end of the liner comprises a second hole, a second tube body at lower end of the second hole and connecting to the liner through the second hole;
a first wiring passage is formed with interior of the first tube body, the first hole, and the inside of the liner, that connects to the upper cavity;
a second wiring passage is formed with interior of the second tube body, the second hole, and the inside of the liner, that connects to the lower cavity;
the splicing blocks comprises a first fixed splicing block, a second fixed splicing block, and a plurality of movable splicing blocks;
the first fixed splicing block and the second fixed splicing block limit all movable splicing blocks, two adjacent splicing blocks are mutually coupled;
each of the splicing blocks comprises a block body, an interlocking section connected to the block body, a groove between the interlocking section and the block body, and an outer surface of the interlocking section that matches contour of the outer surface of the liner;
the first fixed splicing block is disposed outside the first tube body on the surface of the liner and connected to the first tube body, and the button is fit inside the block body of the first fixed splicing block;
the second fixed splicing block is disposed outside the second tube body on the surface of the liner and connected to the second tube body, and the charging interface is fit inside of the block body of the second fixed splicing block;
at least one of the splicing blocks comprises one or more sound passages, each of the sound passages comprises a sound inlet port, a sound outlet port, and a middle section between the sound inlet and outlet ports; the middle section is disposed in a hollow space inside the splicing block; the sound inlet port is disposed in the center of the interlocking section and connects to the middle section to the sound transmission hole; the sound outlet port is in a form of the sound transmission hole on a side wall of the splicing block or a plurality of micro holes arranged in an array on the surface of the splicing block; and
a sound transmission channel is formed by the cavity inside the liner, the sound transmission holes, the sound inlet port, the hollow space inside the splicing block, and the sound outlet port in the form of the sound transmission hole on the side wall of the splicing block or the plurality of the micro holes arranged in the array on the surface of the splicing block.

2. The magic cube speaker as described in claim 1, further comprising
a microphone electrically connected with the controller, wherein the microphone accepts an external sound signal and transmits a control signal to the controller, and the controller performs internal analysis based on the control signal and control the speaker to play music or change play mode.

3. The magic cube speaker as described in claim 2, further comprising an antenna electrically connected with the controller, wherein the antenna transmits signals in connection with the controller.

4. The magic cube speaker as described in claim 2, further comprising a memory storage device electrically connected with the controller.

5. The magic cube speaker of claim 1, further comprising
a charging circuit, and
a charging status indicator electrically connected to the charging circuit,
wherein the charging interface is electrically connected to the battery via the charging circuit, the charging circuit charges the battery when power is supplied to the charging interface, and the charging status indicator lights up during charging.

6. The magic cube speaker as described in claim 1, further comprising
an internal power detecting circuit in the battery.

7. The magic cube speaker as described in claim 1, wherein the lower cavity of the liner below the printed circuit board substrate forms to a sound cavity and comprises at least one through hole that penetrates from the inside of the lower cavity to the outside of the liner.

8. The magic cube speaker as described in claim 1, wherein the printed circuit board substrate further comprises a linking hole that connects the upper cavity to the lower cavity.

9. The magic cube speaker as described in claim 1, further comprising
a sound guiding cone inside the cavity of the liner with a lower end and an upper end,
wherein the lower end of the sound guiding cone comprises a conical curved surface for refracting sound; a diameter of a cross section on the upper end of the conical curved surface is larger than that a diameter of the cross section on the lower end of the conical curved surface, whereby the speaker inside the liner makes a sound, part of the sound is refracted through the sound guide cone and transmitted from the sound transmission hole.

10. The magic cube speaker as described in claim 9, wherein the sound guiding cone is fixedly connected to the liner through a linking strip; and the linking strip is placed between two adjacent sound ports that does not affect sound transmission.

11. The magic cube speaker as described in claim 1, wherein the positive electrode of the charging interface is disposed in a middle of the charging interface, and the negative electrode of the charging interface is disposed at an edge of the charging interface;
the negative electrode comprises a main body with multiple plate-shaped negative electrode sockets in a circular array and a tubular body disposed at a lower end of the main body;
a circular hole extends from the main body toward the tubular body in the middle of the negative electrode;
outer surface of the tubular body has an external screw structure that matches an inner screw structure of the liner;
the positive electrode of the charging interface is disposed in the circular hole, and an insulator is disposed between the positive electrode and the negative electrode;
the negative electrode of the charging interface is electrically connected to the negative electrode of the battery; and
the positive electrode is electrically connected to the positive electrode of the battery.

12. The magic cube speaker as described in claim 1, further comprising
a metal nut mounted on the liner, wherein the negative electrode of the charging interface is mounted on the metal nut,
a metal screw rod at the lower end of the negative electrode of the charging interface, the metal screw rod and the metal nuts being connected by screw structure, and
a metal ring on the upper end of the negative electrode of the charging interface, the metal ring having an upper end with a flat surface;
wherein the positive electrode of the charging interface is a solder joint mounted on the printer circuit board substrate;
the printed circuit board substrate is insulating, and back surface of the printed circuit board substrate is welded with a wire to form a positive electrode cable, and the negative electrode of the charging interface comprises a perforation inside for passing through the positive electrode cable to the liner;
the negative electrode of the charging interface is connected to the metal screw rod through the metal ring, and then connected to the metal nut, and a negative electrode cable is directly connected to the liner by welding.

13. The magic cube speaker as described in claim 1, wherein the plurality of movable splicing blocks further comprise
an upper splicing group composed of movable splicing blocks,
a middle splicing group composed of movable splicing blocks, and
a lower splicing group composed of movable splicing blocks,
wherein the middle splicing group sits between the upper splicing group and the lower splicing group; the upper splicing group surrounds the first fixed splicing block; and the lower splicing group surrounds the second fixed splicing block.

14. A charging stand for charging the magic cube speaker as described in claim 1, comprising
a base body,
a charging plug mounted on the base body,
a USB interface electrically connected to the charging plug, and
a recessed area that matches the magic cube speaker for placing the magic cube speaker thereon,
wherein the charging plug is placed at the recessed area, and the charging stand charges the battery inside the integrated magic cube speaker through the charging interface of the integrated magic cube speaker.

15. A portable charging block for charging the magic cube speaker as described in claim 1, comprising
a casing comprising a bottom and a side wall,
a charging component fixedly mounted on the bottom of the casing, and
a data cable interface fixedly mounted on the side wall of the casing,
wherein the charging component is electrically connected to the data cable interface and matching with the charging interface of the integrated magic cube speaker.

16. A method for controlling play mode of the magic cube speaker of claim 1, comprising
pressing the button on the first fixed splicing block of the magic cube module with a tapping variation to generate a control signal,
receiving the control signal corresponding to the tapping frequency,
reading and comparing the control signal with an internally pre-stored data by the controller of the speaker,
controlling the loudspeaker to generate a sound corresponding to the control signal inside the cavity of the liner,
playing the sound through the speaker,
wherein the tapping variation is a tapping frequency or a tapping interval.

17. A method for controlling play mode of the magic cube speaker of claim 1, comprising
communicating from a mobile terminal with the short-range wireless communication module of the speaker with a control signal via wireless communication,
obtaining and reading the control signal from the short-range wireless communication module by the controller,
performing internal analysis by the controller, and
playing out data stored in a memory storage device through the speaker.

* * * * *